METHOD FOR PREPARING METAL ALUMINUM HYDRIDES

Frank P. Del Giudice, Beverly, Mass., assignor to Metal Hydrides Incorporated, Beverly, Mass., a corporation of Massachusetts
No Drawing. Filed Apr. 7, 1960, Ser. No. 20,554
20 Claims. (Cl. 23—14)

This invention relates to a method for preparing metal aluminum hydrides having the formula $M(AlH_4)_x$ where M is an alkali metal or alkaline earth metal and $x$ is the valence of the metal. More particularly, the invention relates to a method for preparing sodium aluminum hydride.

The patent to H. I. Schlesinger and A. E. Finholt No. 2,567,972, dated September 18, 1951, describes a method for preparing a metal aluminum hydride having the above formula. This method comprises reacting a hydride of an alkali metal or alkaline earth metal with an aluminum halide in an ether reaction medium. The reaction is illustrated by the equation:

$$4LiH + AlCl_3 \rightarrow LiAlH_4 + 3LiCl$$

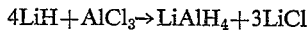

Lithium aluminum hydride of high purity has been prepared in high yield commercially for several years by this method. However, the method has not been found satisfactory for the preparation of sodium aluminum hydride and other metal aluminum hydrides.

I have discovered a method whereby sodium aluminum hydride and other alkali metal and alkaline earth metal aluminum hydrides having the formula $M(AlH_4)_x$ can be synthesized directly from the elements. In accordance with the invention an alkali metal, such as sodium, lithium or potassium, or an alkaline earth metal, such as calcium or magnesium, or the hydride of an alkali or alkaline earth metal, is heated at an elevated temperature in a confined reaction zone with finely divided aluminum metal and a catalytic amount of a reaction promoter in an inert liquid carrier in the presence of hydrogen under superatmospheric pressure while agitating the mixture until reaction between the aluminum, hydrogen and the alkali metal or alkaline earth metal or hydride thereof is complete. I have found a temperature between about 100° C. and 200° C. and a hydrogen pressure between about 2500 and 5000 p.s.i. to be suitable. A higher pressure may be used but is not necessary.

Suitable reaction promoters for use in the practice of the invention are complex hydrides having the formula $M(BH_4)_x$ where M is an alkali metal or alkaline earth metal or aluminum and $x$ is the valence of the metal. Illustrative of such complex hydrides are the borohydrides of sodium, potassium, lithium, calcium and aluminum. The aluminum borohydride may be preformed as an ether complex or may be formed in situ by reaction of a mixture of a halide of a polyvalent metal having a valence from three to five, such as aluminum chloride or titanium tetrachloride, with an alkali metal borohydride. The amount of such reaction promoter used may vary from about 0.1 to 25 percent or more by weight based upon the weight of alkali metal or alkaline earth metal reactant initially in the reaction mixture.

Suitable inert liquid carriers are saturated liquid hydrocarbons, such as hexane, octane, ligroin and cyclohexane; the lower alkyl ethers, such as dimethyl ether, diethyl ether, diisopropyl ether and dibutyl ether; and ethers such as tetrahydrofuran, dioxane or the dimethyl ether of ethylene glycol.

The invention is illustrated further by the following specific examples.

Example 1

32 grams of 30 mesh aluminum metal, 28 grams of sodium hydride as a 21% dispersion in mineral oil, 1 gram of lithium borohydride and 500 ml. of tetrahydrofuran were charged into a 1000 ml. Magne-Dash reactor fitted with a magnetic agitator and suitable heating means. Hydrogen was introduced into the reactor under a pressure of about 4800 p.s.i. The reaction mixture then was heated for 15 hours at a temperature between 150° and 160° C. with continuous agitation. After cooling, the reaction mixture was filtered and the filter residue washed with two 50 ml. portions of tetrahydrofuran. The combined filtrates were vacuum evaporated at 60° C. to remove all tetrahydrofuran. The resultant oil-hydride slurry was then filtered and the residual oil removed from the product residue by washing with five 50 ml. portions of diethyl ether. The product was dried in vacuo at 80° C. for one hour. The product was sodium aluminum hydride having a purity of 81.8 percent, the yield being 68.6 percent.

Example 2

32 grams of 30 mesh aluminum metal, 28 grams of sodium hydride as a 21% dispersion in mineral oil, 1 gram of sodium borohydride, 3.5 grams of aluminum chloride and 500 ml. of tetrahydrofuran were charged into the reactor described in Example 1. Hydrogen was introduced into the reactor under a pressure of about 5000 p.s.i. The reaction mixture then was heated for 15 hours at a temperature between 142° and 150° C. with continuous agitation. After cooling the reaction mixture, the product was recovered as described in Example 1. The product was sodium aluminum hydride having a purity of 96.3 percent, the yield being 83.4 percent.

I claim:

1. The method for preparing a metal aluminum hydride having the formula $M(AlH_4)_x$ where M is a metal selected from the group consisting of alkali metals and alkaline earth metals and $x$ is the valence of the selected metal which comprises heating in a confined reaction zone a material selected from the group consisting of alkali metals, alkaline earth metals and hydrides of such metals with finely divided aluminum metal and a catalytic amount of a complex hydride as a reaction promoter in an amount from about 0.1 to 25 percent by weight based upon the weight of said selected material used in an inert liquid carrier at a temperature above about 100° C. but below the decomposition temperature of any compound in the reaction mixture in the presence of hydrogen under superatmospheric pressure above about 2500 p.s.i. while agitating the mixture until reaction between said selected material, aluminum and hydrogen is complete, said complex hydride having the formula $M(BH_4)_x$ where M is a metal selected from alkali metals, alkaline earth metals and aluminum and $x$ is the valence of the metal.

2. The method as claimed by claim 1 wherein said selected material is an alkali metal.

3. The method as claimed by claim 1 wherein said selected material is an alkali metal hydride.

4. The method as claimed by claim 2 wherein said elevated temperature is between 100° C. and 200° C. and said pressure is between 2500 and 5000 p.s.i.

5. The method as claimed by claim 3 wherein said elevated temperature is between 100° C. and 200° C. and said pressure is between 2500 and 5000 p.s.i.

6. The method as claimed by claim 4 wherein said complex hydride is an alkali metal borohydride.

7. The method as claimed by claim 4 wherein said complex hydride is aluminum borohydride.

8. The method as claimed by claim 4 wherein said complex hydride is lithium borohydride.

9. The method as claimed by claim 5 wherein said complex hydride is an alkali metal borohydride.

10. The method as claimed by claim 5 wherein said complex hydride is aluminum borohydride.

11. The method as claimed by claim 5 wherein said complex hydride is lithium borohydride.

12. The method as claimed by claim 6 wherein said selected material is sodium metal.

13. The method as claimed by claim 7 wherein said selected material is sodium metal.

14. The method as claimed by claim 8 wherein said selected material is sodium metal.

15. The method as claimed by claim 9 wherein said selected material is sodium hydride.

16. The method as claimed by claim 10 wherein said selected material is sodium hydride.

17. The method as claimed by claim 11 wherein said selected material is sodium hydride.

18. The method as claimed by claim 12 wherein said inert liquid carrier is tetrahydrofuran.

19. The method as claimed by claim 13 wherein said inert liquid carrier is tetrahydrofuran.

20. The method as claimed by claim 14 wherein said inert liquid carrier is tetrahydrofuran.

References Cited in the file of this patent

UNITED STATES PATENTS

| | | |
|---|---|---|
| 2,372,671 | Hansley | Apr. 3, 1945 |
| 2,729,540 | Fisher | Jan. 3, 1956 |
| 2,856,428 | Brown | Oct. 14, 1958 |
| 2,900,402 | Johnson | Aug. 18, 1959 |
| 2,920,935 | Finholt | Jan. 12, 1960 |
| 2,992,248 | Pearson | July 11, 1961 |
| 3,057,686 | Mutterties | Oct. 9, 1962 |

FOREIGN PATENTS

| | | |
|---|---|---|
| 810,726 | Great Britain | Mar. 25, 1959 |